(12) United States Patent
Wolfinger

(10) Patent No.: US 10,546,476 B2
(45) Date of Patent: Jan. 28, 2020

(54) SAFETY DEVICE FOR BREAK-IN-PREVENTION

(71) Applicant: GeRoTech-Innovations GmbH, Vienna (AT)

(72) Inventor: Gerd Wolfinger, Hagenbrunn (AT)

(73) Assignee: GeRoTech-Innovations GmbH, Vienna (AT)

( * ) Notice: Subject to any disclaimer, the term of this patent is extended or adjusted under 35 U.S.C. 154(b) by 0 days.

(21) Appl. No.: 16/342,420

(22) PCT Filed: Oct. 16, 2017

(86) PCT No.: PCT/EP2017/076286
§ 371 (c)(1),
(2) Date: Apr. 16, 2019

(87) PCT Pub. No.: WO2018/073147
PCT Pub. Date: Apr. 26, 2018

(65) Prior Publication Data
US 2019/0251814 A1  Aug. 15, 2019

(30) Foreign Application Priority Data
Oct. 17, 2016  (AT) .............................. A 60001/2016
Feb. 9, 2017  (AT) .............................. A 50106/2017

(51) Int. Cl.
G08B 15/00 (2006.01)
G08B 13/196 (2006.01)
(Continued)

(52) U.S. Cl.
CPC .......... *G08B 15/002* (2013.01); *F21V 3/0615* (2018.02); *G08B 13/19619* (2013.01);
(Continued)

(58) Field of Classification Search
CPC ....................... H05B 33/0803; H05B 37/0272; H05B 33/08; H05B 37/02; H05B 37/0245;
(Continued)

(56) References Cited

U.S. PATENT DOCUMENTS 4,212,007 A 7/1980 Reyes et al.
4,970,489 A 11/1990 Jenkins et al.
(Continued)

FOREIGN PATENT DOCUMENTS

CN 203286484 U 11/2013
DE 102009015466 A1 9/2010
(Continued)

OTHER PUBLICATIONS

International Search Report & Written Opinion of the International Searching Authority Application No. PCT/EP2017/076286 Completed: Nov. 23, 2017; dated Nov. 30, 2017 11 Pages.
(Continued)

*Primary Examiner* — Vibol Tan
(74) *Attorney, Agent, or Firm* — Whitmyer IP Group LLC

(57) ABSTRACT

In order to be able to realistically display and imitate the presence of humans and/or animals in a building with simple, inexpensive means, it is provided that the intensity of the radiated light of at least one group of adjacent light sources is reduced relative to the intensity of the radiated light from light sources of the arrangement outside of the at least one group in order to imitate a shadow on a wall illuminated by the security device and further light sources are added to at least one group and/or light sources of the at least one group are removed from the same and the intensity of the radiated light of an added light source is reduced and the intensity of a remote light source is increased in order to imitate a movement of the shadow.

16 Claims, 6 Drawing Sheets

(51) Int. Cl.
  *H05B 33/08*   (2006.01)
  *G08B 25/00*   (2006.01)
  *F21V 3/06*    (2018.01)
  *F21Y 115/10*  (2016.01)

(52) U.S. Cl.
  CPC ..... *G08B 13/19695* (2013.01); *G08B 25/008* (2013.01); *H05B 33/0845* (2013.01); *F21Y 2115/10* (2016.08)

(58) Field of Classification Search
  CPC ........ H05B 33/0845; A61N 2005/0626; A61N 2005/0653; F21Y 2115/10; G08B 15/002; G08B 13/19617; G08B 5/36; F21V 3/0615
  See application file for complete search history.

(56) References Cited

U.S. PATENT DOCUMENTS

| | | | |
|---|---|---|---|
| 5,252,947 A | 10/1993 | Marciano | |
| 5,749,646 A | 5/1998 | Brittell | |
| 7,408,472 B2* | 8/2008 | Von Gunten | G08B 15/002 200/19.01 |
| 7,719,435 B2* | 5/2010 | Readler | G08B 15/002 340/309.16 |
| 9,854,386 B2* | 12/2017 | Karp | G05B 15/02 |
| 10,075,828 B2* | 9/2018 | Horton | G05B 15/02 |
| 10,306,728 B2* | 5/2019 | Crosbie | F21S 2/00 |
| 10,360,779 B2* | 7/2019 | Correnti | G08B 15/002 |
| 2009/0109051 A1 | 4/2009 | Bodden et al. | |
| 2012/0013238 A1 | 1/2012 | Jonsson | |
| 2015/0070658 A1 | 3/2015 | Poesch et al. | |
| 2016/0261425 A1* | 9/2016 | Horton | G05B 15/02 |
| 2019/0242539 A1* | 8/2019 | Roberts | F21S 8/006 |

FOREIGN PATENT DOCUMENTS

| | | |
|---|---|---|
| DE | 102011084325 A1 | 4/2013 |
| WO | 2009081382 A1 | 7/2009 |
| WO | 2016051352 A2 | 4/2016 |

OTHER PUBLICATIONS

Austrian Office Action Application No. A50106/2017 Completed: Aug. 16, 2017 1 Page.

\* cited by examiner

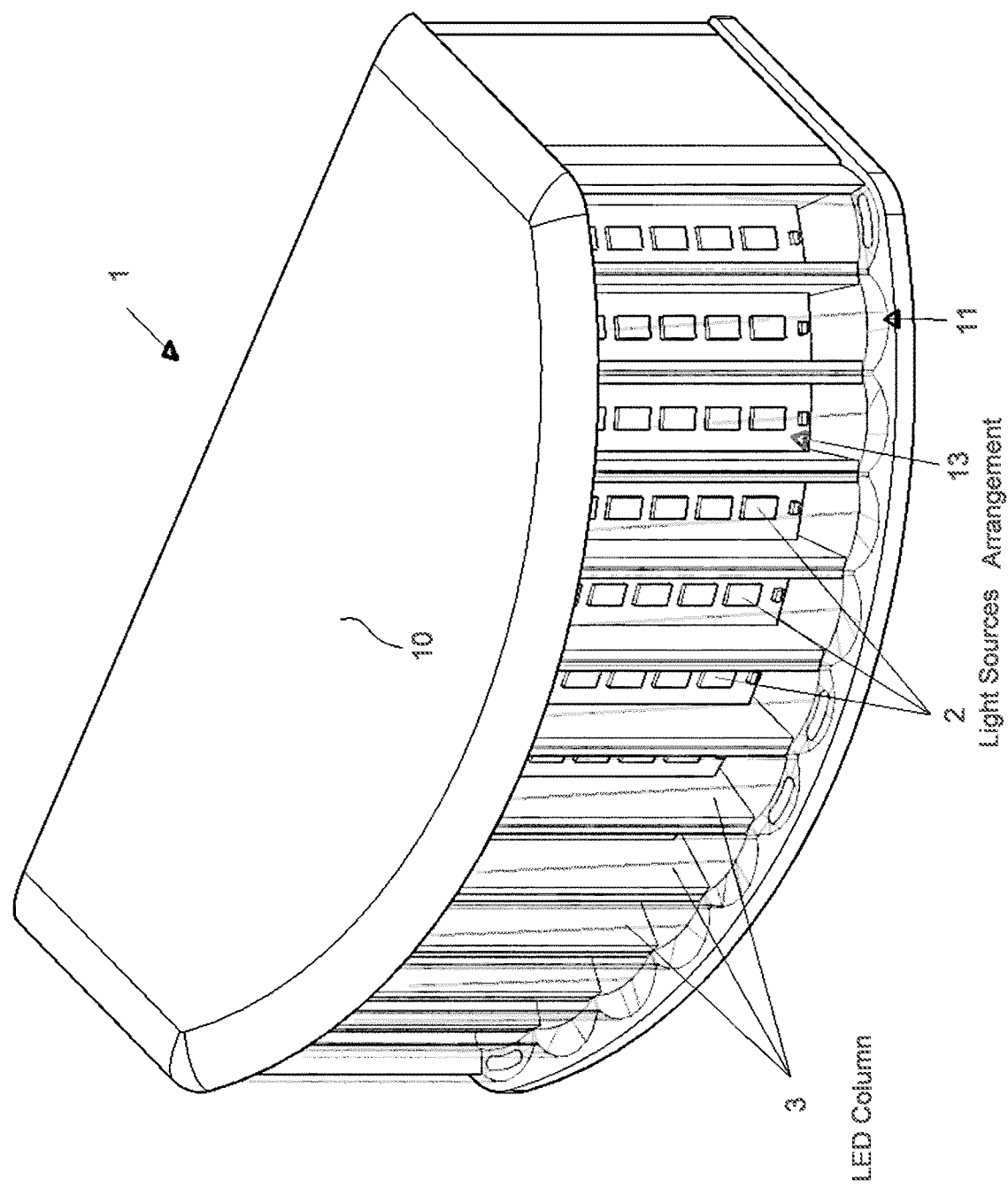

SAFETY DEVICE FOR BREAK-IN-PREVENTION

TECHNICAL FIELD

One object of the present teaching relates to a method for imitating a shadow from a shadow-casting object with a security device and the security device itself.

BACKGROUND

In burglary prevention, it is provided in the prior art to operate devices in the absence of persons within a building to simulate the presence of a person or animal to deter potential burglars. Known as "electronic guard dogs" (e.g. U.S. Pat. No. 4,212,007 A) with proximity sensors that reproduce barking sounds or TV simulators (e.g. U.S. Pat. No. 5,252,947 A) that simulate the typical light from a television. CN 203286484 U describes an LED lighting unit that generates a flickering light, for example to simulate a television. The LEDs of the lighting unit are activated in order to cause the flickering effect. TV simulators have the disadvantage of being indirectly related to presence since one assumes that someone only sits in front of the TV.

Automated on and off switching of light according to the 24-hour rhythm of a person is also used, as well as intelligent roller shutter controls combined with motion detectors. A disadvantage of such methods is that their deterrent potential in today's automation is comparatively low.

Furthermore, it is known from the claims of DE 10 2011 084 325 A1 to use LED projectors in order to project human or animal images on flat or cylindrical screens. Disadvantages arise from the installation and deinstallation expenditures of the screens and the high cost of these and of the LED projectors. Apart from that, in direct projections that display the image of a person or an animal, it is easy to recognize whether it is real or not.

DE 10 2009 015 466 A1 mentions the generation of light shadow switching by means of a controllable light source. By controlling the light source, moving shadows are also imitated. However, apart from the use of a light source with LED lamps, there is no indication as to how this goal should concretely be achieved.

WO 2009/081382 A1 describes a lighting unit with a matrix-like arrangement of LEDs, which is used to illuminate a building. The LEDs can be individually and independently controlled to produce the desired lighting.

SUMMARY

One object of the present teaching is to provide a safety device and a method which make it possible, with the simplest, most cost-effective means, to realistically display and imitate the presence of humans and/or animals in a building.

This object is achieved by a device according to the features of the cited device and method claims. The light radiated by the light sources evenly illuminates an illuminated surface. If now a group of adjacent light sources is reduced in intensity relative to the intensity of the radiated light from light sources outside the at least one group, a realistic shadow can be simulated on the illuminated surface in a very simple manner, whereby a shadow effect can be generated in a simple manner. The combination of juxtaposed light sources also makes it possible to regulate their intensity together, which facilitates the control of the light sources.

According to the present teaching, a dynamic shadow can be generated very simply if additional light sources are added to the at least one group and/or if light sources of the at least one group are removed from the latter and if the intensity of the radiated light from an added light source is reduced and the intensity of a remote light source is increased. Effects can be simulated in a simple way such as a movement of the shadow, a larger or smaller shadow or a shadow generated by a candle. This enables particularly realistic shadow simulations.

The control of the security device can be simplified considerably if a matrix-like arrangement consists of a plurality of columns of light sources and a plurality of rows of light sources, and all the light sources from a column are assigned to the at least one group.

The shadow can be simulated even more realistically if the intensity of the radiated light from the light sources of the at least one group is controlled according to a bell curve, with one or more light sources in the center of the group radiating with the lowest intensity and the intensity of the radiated light from the adjoining light sources increasing according to the bell curve. In this way, hard transitions at the boundary of the simulated shadow can be avoided.

The control can also be simplified if several light sources of the group are controlled together and in the same manner in the intensity of the radiated light.

The flexibility of the security device in the possibilities of shadow simulation can be increased if all light sources of the group are individually and independently controlled in the intensity of the radiated light.

A simple adaptation to existing room lighting is possible if, in addition, the light color of at least one light source of the arrangement, preferably all light sources of the arrangement, is controlled together.

Another or additional possibility to influence the radiated light of the safety device is the use of an optical element for a light source or a group of light sources. Thus, the radiated light from the light source or the group of light sources can be easily bundled or scattered.

If the optical element is made of intelligent glass, the intensity of the radiated light can also be influenced via the optical element.

BRIEF DESCRIPTION OF THE DRAWINGS

The present teaching is described in greater detail in the following with reference to FIGS. 1 to 7, which show exemplary, schematic and non-limiting advantageous embodiments of the present teaching. In the drawings:

FIG. 2 shows a perspective, schematic representation of a variant of the construction of the safety device.

DETAILED DESCRIPTION

The present teaching is based on research that reflects the typical scenarios of an inhabited house that are visible from the outside. Coupled with the need for a realistic representation to provide high deterrent potential, images in shadow shapes have proven ideal. In order to achieve realistic effects, the device consists of a light source, which is designed in such a way that, in contrast to LED projectors, it produces a pleasant, warm light that hardly differs in intensity and light color from conventional light sources, which are used for room or ambient lighting.

The research has also shown that typical shadows are not too likely to be 1:1 images of a person, an animal or an object, but consist of random patterns whose appearance is formed by reflection and absorption of the radiated light. The edges of a shadow that arises, for example, when a person and/or an animal passes through the light beam of a typical light source of a building, is displayed in most cases in a blurred manner on walls, amenities and/or objects. This effect is based on the fact that most lighting fixtures do not consist of singular point light sources but have a larger surface area or are composed of several light sources and usually have a high radiation angle, for example of 120°. A light from such sources strikes the shadow-casting object from different directions, creating several overlapping shadow images with blurred edges.

The present teaching uses these findings and realistically recreates the described appearances by means of an intensity-controllable arrangement of individual light sources, preferably with an optical element in front, as described in the claims of the device, so that the viewer, for example, looking through a window from the outside, is not able to see any difference from reality.

Even with prolonged and detailed observation of the shadow images from the outside, it is difficult to distinguish between reality and simulation due to the sophisticated algorithm described in the method claims.

There are various structural and electrical embodiments of the safety device that simulate movements of humans and/or animals, as described below.

Figure 1:
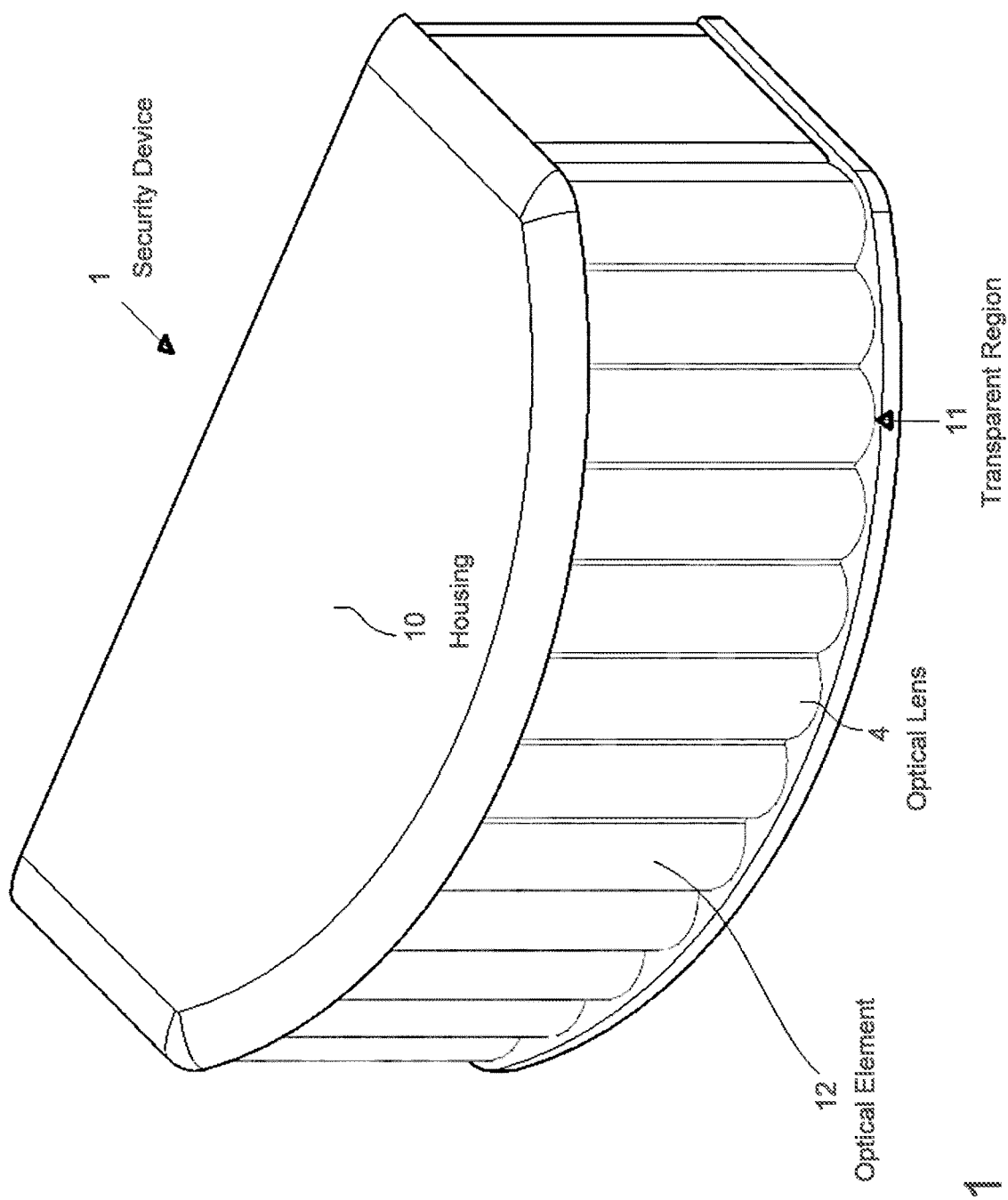
FIG. 1 shows a perspective, schematic representation of a variant of the safety device.

The safety device 1 is shown in an advantageous embodiment in FIGS. 1 and 2 and comprises a housing 10 in which an arrangement 13, preferably a matrix-shaped arrangement, of a plurality of light sources 2 is arranged, wherein the light sources 2 are arranged side by side and one above the other (also offset from each other). A matrix-shaped arrangement 13 of light sources 2 consists of a number of adjacent rows of light sources 2, wherein a number of light sources 2 is provided in each row. In this case, it is not necessary to provide the same number of light sources 2 in each row. Also, adjacent rows do not always need to be equidistant and the spacing between adjacent rows may vary within the rows. Adjacent light sources 2 of a row do not always have to be equidistant from each other. In a uniform arrangement (as shown in FIG. 2), the matrix-shaped arrangement 13 of light sources 2 is formed by a number of adjacent rows and a number of adjacent columns of light sources 2. The light sources 2 of a row and a column in the uniform arrangement are preferably also arranged with regular spacing.

The housing 10 is naturally transparent in the region of the arrangement 13 of light sources 2, so that light can be radiated from the safety device 1. Preferably, a side surface of the housing 10 is transparent. Within the object of the present teaching, a transparent region 11 is in particular understood as a translucent region, and also an embodiment where the housing 10 is cut out in the region of the arrangement 13 of light sources 2. Individual or groups of light sources 2, for example an entire column of light sources 2, may be associated with an optical element 12, for example an optical lens 4 or a lens system, to bundle or scatter the radiated light from a light source 2 or the group of light sources 2. In a particularly advantageous embodiment, the transparent region 11 is at least partially designed as an optical element 12. In a particularly advantageous embodiment, each light source 2 has its own optical element 12.

Mainly monochrome SMD LEDs with high luminous efficacy and low power consumption are used as the light source 2. Mostly warm light sources (light color typically 2700K) are used to radiate pleasant light. Of course, other types of light sources 2 can be used, even with other light colors and light characteristics.

Alternatively, multicolor LEDs in all forms (e.g. RGB, RGBW, wired or SMD) can be used as the light source 2. Multi-colored LEDs have the advantage that you can adapt to the light color of the light sources already in the building and therefore meet the highest simulation requirements.

LEDs, or general light sources 2, with a built-in lens as the optical element 12 are also an alternative.

The preferred object of the safety device 1 is to direct the light of the light sources 2 (LEDs) to the illuminated surfaces in such a way that uniformly homogeneous illumination is achieved, but also that individual areas of the illuminated surface can be softly hidden (=no hard transitions between the areas). For this purpose, the light sources are preferably arranged such that the light radiated by the individual light sources 2 at a certain distance from the safety device 1 is at least partially overlapped, which allows a uniform homogeneous illumination.

Figure 3A:
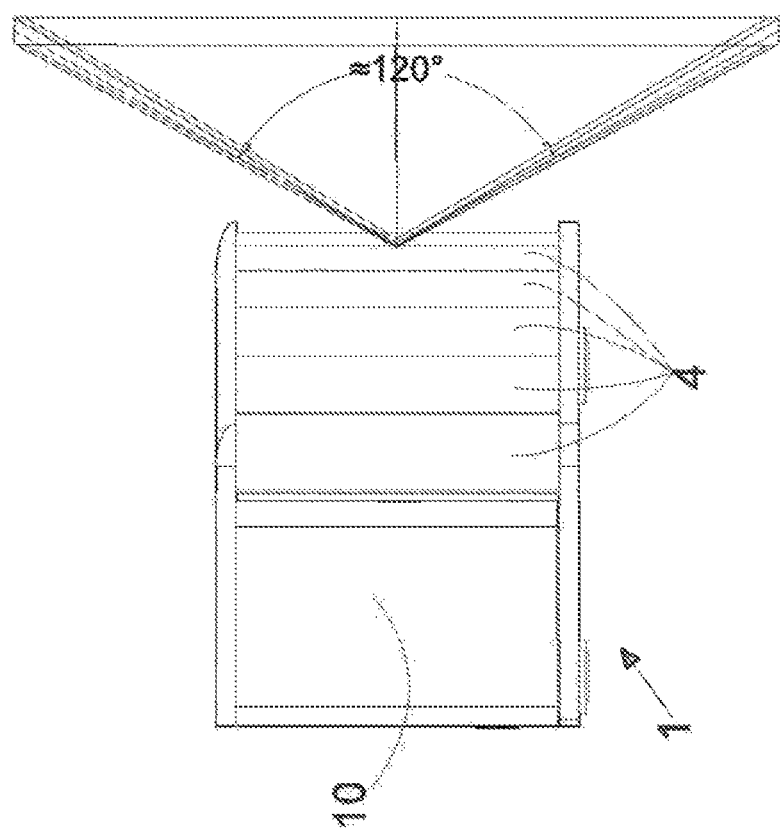
FIGS. 3a and 3b show radiation angles of the safety device in an exemplary embodiment.
Figure 3B:
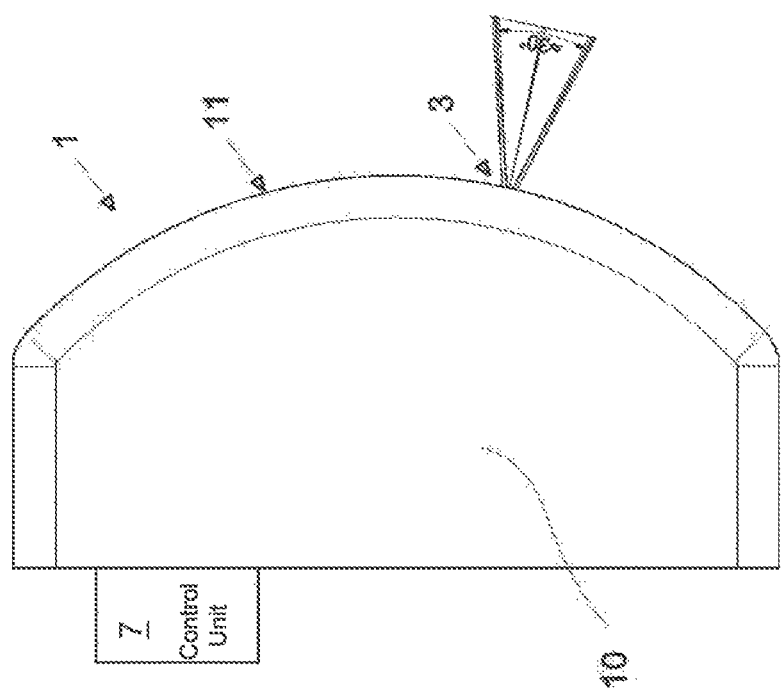

In an exemplary variant, e.g. 12*5 LEDs (as a concrete example, a light source 2) are mounted on the outer surface of a cylinder with about 10 cm radius and 5 cm height so that 12 LEDs in a row are respectively next to each other, horizontally on, for example, a 100° sector of the cylinder and 5 LEDs in each column are vertically located one below the other in a matrix-shaped arrangement 13 of light sources 2, as shown in FIG. 2. The radiation angle of each LED without optical element 12 is about 120° in the assumed LEDs. In front of each LED column 3 a concave-convex cylindrical lens system, for example, is arranged as an optical lens 4, (in FIG. 2 only indicated), which moves the light of each LED column 3 vertically only parallel and therefore lets it pass through unaffected and reduces radiation horizontally to about 30°. This then results in a total radiation of 120° vertically and about 130° (100° sector+2× 30°/2) horizontally (see FIGS. 3a and 3b). The optical system is designed so that the environment at the relevant points in the room is evenly illuminated up to a certain distance (e.g. 4 m) when all the LEDs radiate with equal intensity, since the light from the 12 LEDs on the illuminated areas is overlapped in the distance over a large area.

In another variant, e.g. 12*5 LEDs (as a concrete example, a light source 2) are mounted on a sector of the surface of a sphere with about 10 cm radius or a rotational ellipsoid so that 12 LEDs are respectively located side by side horizontally in a row on, for example, a 100° sector and 5 LEDs are respectively vertically located one below the other in a column on a sector of e.g. 40° degrees in a matrix-shaped arrangement 13. The radiation angle of each LED without an optical system is about 120° for the assumed LEDs. In front of each LED a concave-convex lens, for example, is arranged, which reduces the radiation angle of each LED to e.g. 30°, both vertically and horizontally depending on the distance between the LED and the wall. Shadow effects in the vertical direction can be additionally created by this system.

Of course, embodiments with other radiation angles or arrangements of the light sources 2 are possible. Alternative embodiments may have more or less curved fronts and have arrangements 13 adapted to different rooms. A 360° version for all-round lighting and simulation is also a variant.

In a special variant, it is also possible to design an optical element 12 in front of a light source 2 such that it cannot only deflect or redirect the radiated light, but also modulate the intensity of the penetrating light. For example, an optical element 12 could be made of intelligent glass to take advantage of the intensity modulation advantageous for realistic shadows. Intelligent glass is a material, whose light transmittance is variable by the application of an electrical voltage or by heating.

All the solutions mentioned above have the advantage that it is possible to dispense with devices with high resolution. Even with conventional projectors, the necessary bundling of light, by an image projecting medium, is not needed, which avoids a strong light-attenuating part and the safety device 1 can be designed in a more energy efficient manner.

Energy-efficient versions can also be operated without a fan. As a result, the security device 1 is also silent in this form.

Figure 4:
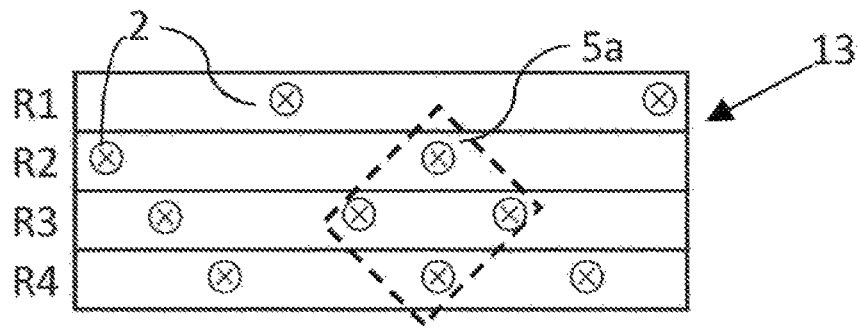
FIG. 4 shows an example of an arrangement of light sources.
Figure 5:
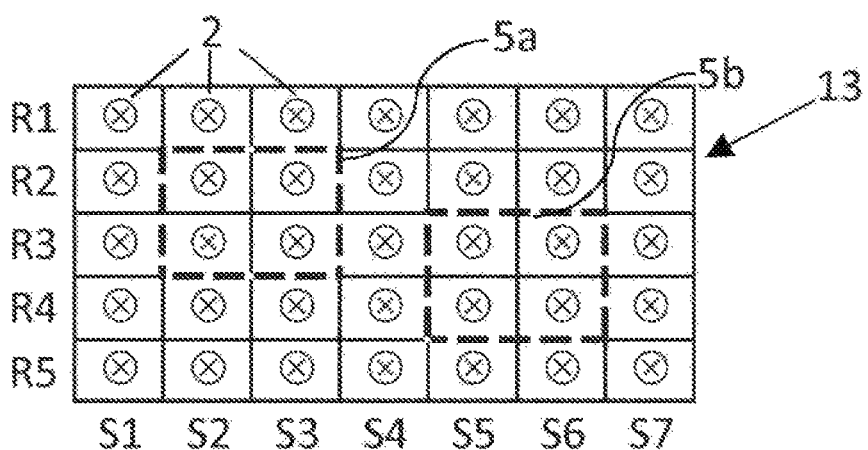
FIG. 5 shows an example of a regular matrix-shaped arrangement of light sources.

In order to simulate shadows with the arrangement 13 of light sources 2, at least one group 5a consisting of a plurality of adjacent light sources 2 is reduced in the intensity of the radiated light. The remaining light sources 2 of the arrangement 13, or at least some of them, continue to radiate light of higher intensity. The term "adjacent light sources 2" is understood to mean light sources 2 which are arranged in the arrangement 13 directly next to or above one another, also obliquely next to or above one another and also offset. This is illustrated by way of example in FIG. 4 for an irregular matrix-shaped arrangement 13 with four rows Rn, n=4 and in each case a number of light sources 2 in each of the rows Rn. FIG. 5 shows a regular matrix-like arrangement 13 with five rows Rn, n=5 and seven columns Sm, m=7. In each row Rn, a light source 2 is arranged in each column Sm, that is to say seven light sources 2 in each row Rn. In this embodiment, for example, two groups 5a, 5b of adjacent light sources 2 are provided for shadow simulation. This allows two shadows to be simulated on the illuminated surface. Of course, a group 5a, 5b may also comprise a linear or annular, generally any, arrangement of light sources 2 to produce different shadow shapes.

The light sources 2 of a group 5a, 5b can be controlled individually and independently or together in the intensity of the radiated light. In any case, the light sources of a group 5a, 5b can be controlled in the intensity of the radiated light, but independently and separately from the light sources outside the group 5a, 5b. Thus, the intensity of the radiated light of the light sources 2 of the group 5a, 5b can be reduced and can radiate the intensity of the radiated light of the remaining light sources independently with higher intensity. Of course, the intensity of the radiated light within a group 5a, 5b does not need to be the same, which is possible with an individual control. Even outside the group 5a, 5b, the intensity of the light radiated by the light sources outside the group 5a, 5b does not need to be the same, but this will normally be the case.

In the simplest embodiment, a group 5a, 5b of adjacent light sources arranged one above the other consisting of different rows Rn of light sources 2, for example, the light sources 2 of a column Sm, of the arrangement 13 in FIG. 5, is formed. In this embodiment, it can also be provided by circuitry that all light sources 2 of a column Sm can only be regulated together in intensity. A group 5a, 5b then comprises at least all the light sources 2 of a column Sm.

However, the assignment of the light sources 2 to a group 5a, 5b can also change during the operation of the safety device 1. It can be used to simulate effects such as multiple shadows, moving shadows, or shadows of different sizes. For example, for a plurality of shadows, a plurality of groups 5a, 5b are defined, and the intensity of the radiated light of the light sources 2 located in the groups 5a, 5b is reduced with respect to light sources 2 except for the groups 5a, 5b. For moving shadows, light sources 2 are added to a group 5a, 5b and/or light sources 2 are removed from a group 5a, 5b. Of course, the added light sources 2 are reduced in intensity and the intensity of the removed light sources is increased. Depending on which light sources 2 are added or removed, the shadow can move in different directions. It can also be used to simulate movements such as bending over, sitting down or jumping. By adding light sources 2 into a group 5a, 5b and/or removing light sources from a group 5a, 5b, a shadow which is larger or smaller can also be simulated as a moving shadow. Of course, these options can be combined arbitrarily.

To control the intensity of the radiated light, the supply voltage or the supply current of a light source 2 can be changed by a control unit 7 and/or the light transmittance of an optical element 12 can also be changed.

As a basis for the controls of the light sources 2 (LEDs), control units 7 with processors are used, such as ATMEL 328P or more powerful models depending on the equipment of the security device 1, for example, which drive the multiplex-free LED driver to avoid unrealistic flicker. In a multiplex-free driver, the desired intensity of a light source 2 remains set, for example, a light source 2 remains on, and is not turned on and off at a high frequency. The control unit 7 can thereby be integrated in the safety device 1, but it can also be external.

Most models of the safety device 1 are operated with external switching power supplies and voltages <24 V, but of course also integrated power supplies are possible.

For perfect integration into the environment to be protected and to facilitate interactions, the security device 1 can provide electronic interfaces in order to be able to receive commands as well as set actions. Thus, two or more security devices can be coupled together through the respective interfaces to simulate room-to-room or floor-to-floor shadow movements. Preferred transport media for this type of communication are LAN/WLAN or Bluetooth in all variants. But other common data transmission options, such as the use of the so-called ISM bands, which are available for domestic areas, are conceivable. In the future, LiFi (=Light Fidelity) interfaces may be available. In the simplest version of the interfaces, there is a socket with a floating contact compatible with any modern alarm system, with an input socket, with a PullUp or PullDown circuit behind it, which takes commands by setting them to zero (GND) or supply (Vcc) potential. By using encodings in the form of protocols, a single input may optionally receive multiple instructions at once.

This allows the incorporation of motion sensors to generate shadows when a person approaches. Of course, an algorithm preferably prevents exact repetition upon re-activation.

The activation and control of the security device 1 can be triggered by versatile options from external components, autonomously automatically or manually. In the automatic mode, for example, a light sensor can take over the activation.

After activation of the security device 1, the light sources 2 of a group 5a, 5b of light sources 2, for example individual columns 3 and/or individual light sources 2 (LEDs) in the arrangement 13, are controlled according to the implemented control such that shadows, preferably moving shadows, arise and the shadow generation intervals remain realistic.

A UPS (uninterruptible power supply) can also be connected to the safety device 1 in order to automatically switch to a candlelight mode after a short time in which the light source 2 is modulated according to candlelight, in order to simulate presence to any burglars, especially also in this case.

As a special extension also network functions (e.g. routers) may be offered in the device. This combination can save space and integrate the security device 1 perfectly into any existing network.

In another alternative, you can influence the mechanisms of the security device 1 in a variety of forms, for example, if you use a related app for Android or iOS devices. This can be used to easily parameterize processes or create schedules and triggers for activation.

Additions to other functions such as clock, radio, disco light, real-time peak meters, spectrum visualization, or controllable illumination of 0-360° degrees are also conceivable.

Figure 6:
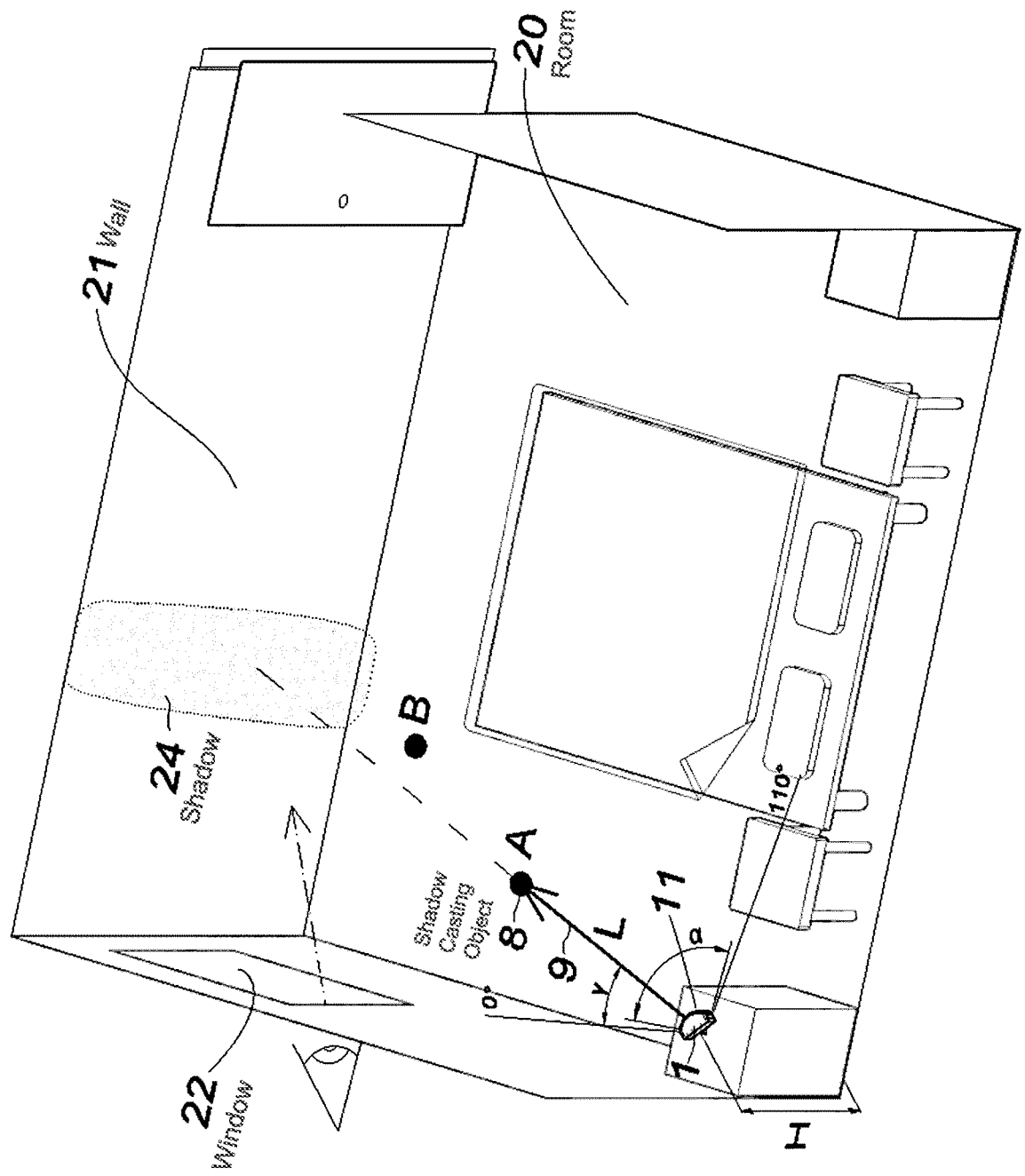
FIG. 6 shows an installation example of the safety device with window without curtain.

Preferably, the security device 1 is placed in a room 20 on a flat, horizontal surface or hung on the ceiling or wall and aligned with the transparent area 11 on a wall 21 which is visible from the outside through a window 22, or a patio door or the like (FIG. 6). The distance and position from the wall 21 are preferably selected such that the entire wall surface visible from the outside is uniformly illuminated by the security device 1. Of course, this distance depends on the radiation angles of the individual light sources 2 and can be specified or can be discerned simply by trial and error. On the wall 21, a shadow 24 is then generated and simulated, which is perceived from outside through the window 22. Of course, other installation locations and installation positions are possible.

Figure 7:
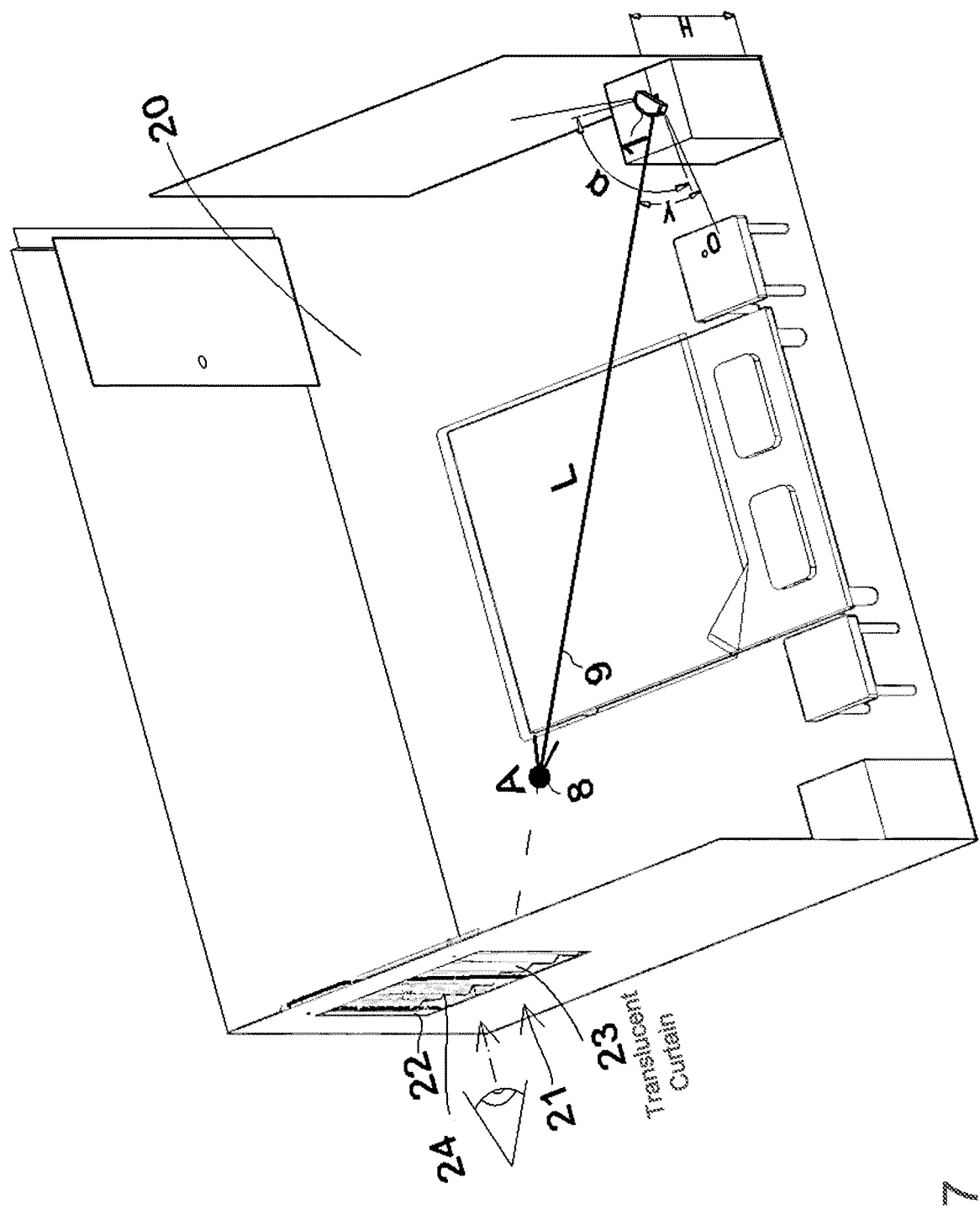
FIG. 7 shows an installation example of the safety device with window with curtain or slat blind.

Alternatively, the safety device can also be aligned as a wall 21 on an opaque but slightly translucent curtain 23 (FIG. 7) or on a closed slat blind which structurally transmits a few rays of light, as long as direct external eye contact with the safety device 1 is avoided. The shadow 24 is generated and simulated on the curtain 23 or the slatted blind as a wall 21. This variant brings out (simulated) movements particularly well, because the shadows are very visible from the outside and are also perceived from great distances. Furthermore, this arrangement is particularly interesting in combination with an electric slat blind system, with which an interactive reaction can be played to the presence of an approaching person from outside. This variant is described in the simulation options.

In general, there are several options available for all applications, depending on if the version is with or without external inputs. A "manual mode" allows, for example, the operation of the security device 1 on a simple timer. An "automatic mode" simulates the scenarios, for example, according to preset algorithms. If the safety device 1 is additionally provided with inputs and/or outputs, it can react particularly realistically to external influences, such as a person approaching a sensor, or trigger further safety devices 1.

Assuming that the security device 1 is aligned with a wall 21, for example the inside of a closed slat blind or an opaque but translucent curtain 23, and the shadows 24 are viewed from the outside through the window 22, situations, for example, simultaneously or separated from each other, can be simulated.

Turning the light on and off in the room.

Movement in a horizontal direction from left to right or vice versa.

Movement along the beam propagation (e.g. in the direction of the slat blind) or in the opposite direction.

Movements in the vertical direction, especially to be able to simulate different heights of the light sources or objects, or, for example, the bending over of persons.

Movement of one or more persons and/or animals.

Movements across multiple rooms or floors, using multiple security devices 1.

Another impressive variant is the simulation of all the previously described movements by candlelight. This variant is ideal for burglary prevention in combination with an uninterruptible power supply. In this case, the security device 1 detects the power failure, turns off the light for a short time, in order to then start the candlelight mode via the uninterruptible power supply.

In another alternative, one can influence the mechanisms of the security device 1 in many different ways, by using a related app for Android or iOS devices. This can be used, for example, to parameterize operations or to create schedules and triggers for activation.

Below are the descriptions of algorithms responsible for the automatic scene compilations.

There are several ways to create shadow images. In the simplest variant, for example, the direction of movement, speed and possibly also other parameters such as acceleration and size of the shadow-casting object are determined by random mechanisms and transmitted to at least one group 5a, 5b of light sources. However, this method has the disadvantage that paths and objects in motion and nature cannot or can only very limitedly be interactively adapted to situations. For example, it is difficult to have a virtual person walking to the window and stopping there when a motion detector registers an approaching person.

In a further possibility, several motion scenarios or other necessary parameters of the shadow simulation are precalculated or created in advance, and the parameters necessary for controlling the light sources 2, for example the at least one group 5a, are stored in a table, for example in a memory of the security device 1. If necessary, the contents of the table are read out and played back via the arrangement 13 of the light sources 2 of the security device 1. This method saves a lot of processor power, but also has the disadvantage that the generated shadows can only be interactively controlled to a limited extent.

Another variant allows external control of the arrangement 13 of the light sources 2. For this purpose, for example, the parameters outside the security device 1 of external computers, and for example of mobile devices, such as smartphones, that are necessary for the shadow simulation or motion scenarios, are generated and transmitted to the security device 1, where required, where the arrangement 13 of the light sources 2 is accordingly driven.

To create realistic shadow images, however, a shadow-casting object 8 is preferably assumed in the room 20 and it is calculated in the security device 1, for example in the control unit 7, which shadow 24 is generated by this shadow-casting object 8 on the wall 21. For this purpose, parameters can be used internally that describe the nature (e.g. size, shape, etc.) and movements of the selected shadow-casting object 8 to be displayed. The control of the security device 1 then converts the settings into shadow movements, which are created by the corresponding activation of the light sources 2. For this purpose, at least one group 5a, 5b of light sources, which are required for shadow generation, are driven in order to lower their intensity of the radiated light with respect to the light sources 2 outside the at least one group 5a, 5b. To generate a shadow 24, certain light sources 2 of the security device 1 are switched off, or in general their intensity is reduced compared to other light sources 2 that illuminate the wall 21.

Depending on the design of the safety device 1, the parameters can also be influenced or parameterized externally. The number of available parameters depends on the specific embodiment of the security device 1.

When the security device 1 is activated, new scenes for the shadows 24 are preferably continuously calculated. Each scene may consist of start and end positions of the shadow-casting object 8 and the desired acceleration, start and/or end speed and deceleration, and the start and end positions may be the same to simulate a still object 8.

Examples of parameters for the algorithms for simulating the shadow cast can be:

The definition of the shape of the shadow-casting object 8. Here, for example, several shapes can be stored and selected. The shapes can also be chosen randomly and also changed automatically or manually.

A maximum horizontal radiation angle α of the security device 1. The maximum radiation angle depends on the physical nature of the optics of the security device 1, as described above. For most variants it will be around 100 degrees. Likewise, a maximum vertical radiation angle could be parameterized.

The position of the shadow-casting object 8 in the room 20 can be indicated by the angle γ and length L of a vector 9 relative to the security device 1. The vector 9 preferably runs horizontally to the security device 1. A possible parameterization of the angle could, for example, comprise an angle range of 0-110°, wherein 0-4° stands for left, outside the physically possible light cone, 5-105° represents a 100° light cone, and 106-110° stands for right, outside the light cone. The length L can, for example, be given as a value between 0-250, which can stand for 0-500 cm. For example, 0 means no light because the shadow-casting object 8 is in front of the light source 2, and 255 means the smallest shadow because the shadow-casting object 8 is furthest away from the light source 2.

An installation height H of the safety device 1 defines the height H to the light source 2. The height of the light source 2 in the room 20 has a direct influence on the shadow images that can be seen on the wall 21. For example, ceiling lights for one person in room 20 are likely to produce lower images than desk lamps for the same person. With this parameter, this influence is taken into account during shadow generation and automatically calculated using position parameters. The mounting height H can be defined as a value between 0-255, which can stand for a height of 0-255 cm.

The size of the shadow-casting object 8 influences the size of the shadow 24. With the same adjusted or calculated distance of the shadow-casting object 8 to the security device 1, a larger shadow 24 is generated when the parameter is selected to be larger. For a large shadow, more light sources will be included in the at least one group 5a, 5b than in a smaller shadow. In this way you can also adjust the shadow size to the room size. So, you will choose larger shadows in a smaller room 20, because the shadow 24 would be smaller by the small distance to the next imaging surface, wherein in larger rooms, the shadow 24 can be chosen smaller because they are big enough anyway due to the distance to the next imaging surface. The size can for example be characterized by 0: small, 1: medium, 2: large. The size can also be changed dynamically. When the safety device 1 is activated, the size is calculated according to the current scene. If, for example, the object 8 fictively moves away from the security device 1, the shadow 24 to be imaged becomes smaller along the way. The size could be changed dynamically in small steps to create this effect.

An initial position A and an end position B can be defined by a respective vector 9, for example. Likewise, a trajectory of the movement of the shadow-casting object 8 from the initial position A to the end position B can be defined. A speed parameter for the movement from start position A to end position B may define how fast the object 8 should move from start position A to end position B. The speed can be specified as the value in cm per second. The value 0 can also be used for no movement. The safety device 1 then automatically generates the shadow 24 for a shadow-casting object 8, which, as parameterized, moves from the initial position A at the specified speed to the end position B in order to get from A to B. In this case, the shadow 24 is recalculated at specific, predetermined times and adjusted by controlling the light sources 2.

Likewise, the number of objects 8 can be set in the room. Thus, the presence of several people can be simulated. Of course, each individual object 8, and also their movement, can be parameterized independently from each other.

An acceleration of the object 8 may indicate how fast the object 8 accelerates or decelerates as it changes its speed. It can be used to simulate people moving slowly or quickly. When entering the light cone, for example, one can assume uniform movement. For example, this could be 0: Uniform motion, 1: Low acceleration, 2: High acceleration can be defined, of course, for the individual stages, an acceleration value is stored.

You can also define a number of permanent objects. Thus, for example, an object can be simulated, which is between the light source 2 and the window 22, such as the pole of a floor lamp that casts shadows.

The type of light source can be set, for example, via the parameters 0: normal light for normal room lighting, 1: Candlelight simulation by intensity and position modulation of the shadow 24, 2-255 may be reserved for light adjustments, e.g., color temperature, etc. Thus, the light of the security device 1 may be matched to other existing light sources 2 to further reduce the difference between true and simulated lighting.

A number parameter of connected security devices may define the number of security devices 1 that can take over the movement of the shadow-casting object 8 from one security device 1 to another. This serves, for example, for cross-spatial simulation in which the object 8 switches from one room and/or one floor to another room/floor.

Of course, other or additional parameters are also conceivable to create and simulate a shadow 24.

The calculation of the shadow 24 for a shadow-casting object 8 at a particular time, which is at a certain position in the room 20 at this time, can be done by simple vector calculations and simple kinematic relationships. For this purpose, only low processing power of the control is needed, which also helps to keep the security device 1 simple.

The shadow 24 can also be calculated with an intensity distribution such that abrupt intensity jumps do not occur, which would be unrealistic for a shadow 24. For this purpose, it may be provided to change the intensity of the light sources 2 involved in the generation of the shadow 24 in the at least one group 5a, 5b according to a bell curve, for example a Gaussian function. Of course, the lowest intensity is provided in the center of the shadow 24 and the intensity increases towards the edge of the shadow 24 in accordance with the defined bell curve. The intensity distribution can also be defined separately in the horizontal and vertical directions, and also in any other direction. If a movement of the shadow-casting object 8 is also simulated, then the shadow 24 adapted in intensity according to the bell curve also moves in the horizontal direction and/or in the vertical direction, or in any other direction.

It is also advantageous if the intensity of the light sources 2 is not changed in leaps and bounds, but continuously, or in such small intensity levels, that a judder-free and flicker-free shadow 24 is formed.

If candlelight is simulated, the shadow 24 may be shifted back and forth at a typical candlelight flicker frequency, preferably in the horizontal direction. The lighting of the candle can be simulated by initially enlarging the shadow 24 and then reducing it to the normal size according to the position of the shadow-casting object 8.

The generation of the shadow 24 should preferably not be repeated, or at least not repeated too often or in too short periods of time. For this purpose, the position and/or the movement of the shadow-casting object 8 or the shadow-casting objects 8 can be selected at random.

Of course, combinations of the above variants of the shadow simulation are possible. The various possibilities for shadow simulation have in common that at certain predetermined times a new shadow scenario is generated by the security device 1 via the activation of the arrangement 13 of the light sources 2. In particular, the intensity of light sources 2 can be changed, light sources 2 can be removed from a group 5a, 5b and/or added, groups 5a, 5b can be generated or removed and or other shadow effects can be generated.

The invention claimed is:

1. A method for imitating a shadow of a shadow-casting object with a security device having an arrangement of light sources, wherein the intensity of the radiated light of at least one group of adjacent light sources is reduced relative to the intensity of the radiated light from light sources of the arrangement outside of the at least one group in order to imitate a shadow on a wall illuminated by the security device and wherein further light sources are added to at least one group and/or light sources of the at least one group are removed from the same and whereby the intensity of the radiated light of an added light source is reduced and the intensity of a remote light source is increased in order to imitate a movement of the shadow.

2. The method according to claim 1, wherein as a movement, a larger or smaller shadow is simulated.

3. The method according to claim 1, wherein by changing the intensity of the radiated light of the at least one group, a shadow generated by a candle is simulated.

4. The method according to claim 1, wherein a shadow is calculated, which is generated by an assumed shadow-casting object on the wall, and the at least one group of light sources required for the generation of the shadow is activated to reduce the intensity of the radiated light of the light sources of this group.

5. The method of claim 1, wherein a matrix-shaped arrangement consists of a plurality of columns of light sources and a plurality of rows (Rn) of light sources, and all light sources of a column are assigned to at least one group.

6. The method according to claim 1, wherein the intensity of the radiated light of the light sources of the at least one group is controlled according to a bell curve, wherein at least one light source in the center of the group radiates with the lowest intensity and the intensity of the radiated light of the adjoining light sources increases according to the bell curve.

7. The method according to claim 1, wherein a plurality of light sources of the at least one group is controlled together and in the same manner in the intensity of the radiated light.

8. The method according to claim 1, wherein all the light sources of the at least one group are individually and independently controlled in the intensity of the radiated light.

9. The method according to claim 1, wherein, in addition the light color, at least one light source of the arrangement is controlled.

10. The method according to claim 1, wherein at least two security devices are coupled to simulate a shadow together.

11. A safety device for imitating a shadow of a shadow-casting object with an arrangement of light sources controllable by a control unit in the intensity of the radiated light, wherein the radiated light of the light sources of the arrangement are at least partially overlapped at a distance from the safety device on an illuminated wall, wherein the control unit reduces the intensity of the radiated light of at least one group of adjacent light sources relative to the intensity of the radiated light from light sources of the arrangement outside the at least one group and wherein the control unit adds further light sources to at least one group and/or removes light sources of the at least one group in order to imitate a movement of the shadow, whereby the control unit reduces the intensity of the radiated light of an added light source and increases the intensity of a remote light source.

12. The safety device according to claim 11, wherein a matrix-shaped arrangement of light sources is provided with a plurality of rows of light sources, wherein in each row is arranged a plurality of light sources.

13. The safety device according to claim 11, wherein a matrix-shaped arrangement of light sources is provided with a plurality of rows of light sources and a plurality of columns of light sources.

14. The safety device according to claim 11, wherein the light sources of the assembly are individually and independently controllable by the control unit in the intensity of the radiated light.

15. The safety device according to claim 11, wherein an optical element is assigned to a light source or a group of light sources in order to bundle or scatter the radiated light of the light source or the group of light sources.

16. The safety device according to claim 15, wherein the optical element is made of intelligent glass.

* * * * *